United States Patent
Shankar

(10) Patent No.: US 12,231,509 B2
(45) Date of Patent: Feb. 18, 2025

(54) APPARATUS AND METHODS FOR DYNAMIC SCALING AND ORCHESTRATION

(71) Applicant: Bank of America Corporation, Charlotte, NC (US)

(72) Inventor: Mani Shankar, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/374,182

(22) Filed: Sep. 28, 2023

(65) Prior Publication Data

US 2024/0022641 A1    Jan. 18, 2024

Related U.S. Application Data

(62) Division of application No. 17/327,876, filed on May 24, 2021, now Pat. No. 11,811,885.

(51) Int. Cl.
| | |
|---|---|
| *H04L 67/51* | (2022.01) |
| *G06F 9/455* | (2018.01) |
| *H04L 9/40* | (2022.01) |
| *H04L 12/66* | (2006.01) |
| *H04L 41/0816* | (2022.01) |
| *H04L 67/1001* | (2022.01) |

(52) U.S. Cl.
CPC .......... *H04L 67/51* (2022.05); *G06F 9/45558* (2013.01); *H04L 12/66* (2013.01); *H04L 41/0816* (2013.01); *H04L 63/08* (2013.01); *H04L 67/1001* (2022.05); *G06F 2009/45595* (2013.01)

(58) Field of Classification Search
None
See application file for complete search history.

(56) References Cited

U.S. PATENT DOCUMENTS

| | | |
|---|---|---|
| 11,005,721 B1 | 5/2021 | Patki et al. |
| 2009/0177743 A1 | 7/2009 | Ashour et al. |
| 2014/0082409 A1 | 3/2014 | Bae et al. |
| 2015/0149635 A1 | 5/2015 | Rajagopalan et al. |
| 2015/0261514 A1 | 9/2015 | Fu et al. |
| 2019/0342383 A1 | 11/2019 | Matican et al. |
| 2021/0075700 A1 | 3/2021 | Palladino et al. |
| 2021/0152631 A1 | 5/2021 | Ravindra et al. |

*Primary Examiner* — Scott B Christensen
(74) *Attorney, Agent, or Firm* — Weiss & Arons LLP

(57) ABSTRACT

Apparatus and methods to dynamically scale and orchestrate services over a network are provided. The apparatus and methods may include two or more computers forming a network cluster. Each computer may have an agent and user service. One or more computers may include a gateway service, authorization service, a pool of network services, and a director service. A user may request access to a network service, and the gateway and director services may grant access to the network service or create a new instance of the network service on any computer in the cluster and then grant access to the network service to the user.

11 Claims, 9 Drawing Sheets

APPARATUS AND METHODS FOR DYNAMIC SCALING AND ORCHESTRATION

FIELD OF TECHNOLOGY

Aspects of the disclosure relate to providing apparatus and methods for dynamically scaling and orchestrating services over a (local) network.

BACKGROUND OF THE DISCLOSURE

Internet/cloud computing has brought many advantages to productivity and computer usage to businesses and other organizations, as well as individuals. For example, an expensive and resource hungry software program may exist in a cloud environment and an individual desktop computer may access and use the program through the cloud without purchasing it or having the necessary hardware.

In another example, one of the benefits of cloud computing is scaling an application/program seamlessly when user or other traffic to the program increases. A cloud computing environment may add, or subtract, computing resources as needed, limited only by the resources available to the entire cloud. In addition, new hardware may be added to the cloud in real-time, without taking the entire cloud network down, avoiding system outages.

Currently, these, and other, cloud computing benefits only exist when using the Internet as the cloud environment. However, many users (individuals or organizations) may not have access to the Internet, or desire to restrict access to the Internet for security or other reasons. These users cannot obtain the enormous benefits cloud computing offers without relinquishing control over Internet access.

Therefore, it would be desirable for apparatus and methods to obtain the advantages of cloud computing environments within a local, non-cloud network. These apparatus and methods may include dynamically scaling and orchestrating services (e.g., applications and software programs) over a network.

SUMMARY OF THE DISCLOSURE

It is an object of this disclosure to provide apparatus and methods to dynamically scale and orchestrate services over a network.

A system/apparatus for dynamic scaling and orchestrating network services over a network is provided. The network may be local. The apparatus may include, inter alia, two or more computers that form a network cluster. Each computer in the network cluster may include, inter alia, a communication link arranged to access the network cluster, i.e., the other computers in the network cluster. Each computer may include non-transitory memory arranged to store at least one or more network services and an operating system. Network services may include, inter alia, applications and software programs accessible over the network. Each computer should preferably include an agent/user service which may include executable code arranged to interface with a gateway service. In an embodiment, the agent service and user services are separate, and in an embodiment, they are combined.

Each computer may also include, inter alia, at least one processor node coupled to the memory and arranged to run the agent service and the operating system, communicate between each computer in the network cluster, and execute/operate one or more of the network services.

The system may include two or more director services, each of which may run on a single computer in the network cluster. The director services may be synced with each other. The director services may act as the network administrator, directing the actions of the network and network cluster. At least one director service must be running while the network cluster is operating. Two director services may provide redundancy and may enable the addition of computers/nodes to the network cluster without taking the network cluster down/without downtime.

The system may include a data store located on one or more of the computers in the network cluster. The data store may include one or more configurations for the network cluster, the computers/nodes in the cluster, each agent/user service, as well as commands for starting and ending the network cluster or network services. In an embodiment, the data store may also include, inter alia, information and details of each network service running or capable of running on the network service.

The system may include one or more gateway services arranged to interface between each agent/user service on each computer in the network cluster and each director service. The gateway service may act as an access point between each agent service and the rest of the computers on the network cluster.

The system may also include an authorization service so that only authorized users may access the network cluster and particular network services. The system may also include a pool of one or more network services. These network services may be located (and running) within the data store and/or within the computers in the network cluster.

In an embodiment, each director service may be arranged to allow a user to add and remove network services from the pool and add and remove computers/nodes from the network cluster.

In an embodiment, each director service may be arranged to start, stop, and transfer/move network services from each computer/node in the network cluster.

In an embodiment, the network cluster may form an internal intranet.

In an embodiment, the data store may be an ETCD data store.

In an embodiment, the user may access the network and the network services through a browser, bespoke application, or other graphical user interface. In another embodiment, the user may access the network and the network services through a command line interface.

In an embodiment, the system may include an encryption controller.

In an embodiment, the non-transitory memory may include executable instructions and at least one datum arranged to authenticate the user and/or the user/agent service.

In an embodiment, the director service(s) may expand or contract the pool of available network services based on an artificial intelligence/machine learning ("AI/ML") algorithm arranged to predict the network services required by the users of the network cluster. For example, the director service may use machine learning algorithms to determine that at 9:00 a.m. on a typical workday, ten messaging network services are required, but only one word-processing network service is required. The director service(s) may pre-load network services according to its prediction algorithm(s).

In an embodiment, between three and five gateway services may be necessary for the efficient functioning of the network cluster. Additional gateway services may have diminishing returns and may degrade the performance of the network cluster.

In an embodiment, each computer on the network cluster includes its own unique IP address or other type of address. Unique addresses may be necessary for the efficient functioning of the network cluster and may be necessary to point each computer and/or user/agent service to the correct location for a desired network service.

In an embodiment, one or more computers in the network cluster may be a virtual machine formed from a computer in the network cluster.

In an embodiment, the system may include a load balancer. In an embodiment, the gateway service may include a load balancer.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3B is a continuation of FIG. 3A.

FIG. 4B is a continuation of FIG. 4A.

FIG. 5B is a continuation of FIG. 5A.

DETAILED DESCRIPTION OF THE DISCLOSURE

Figure 1:
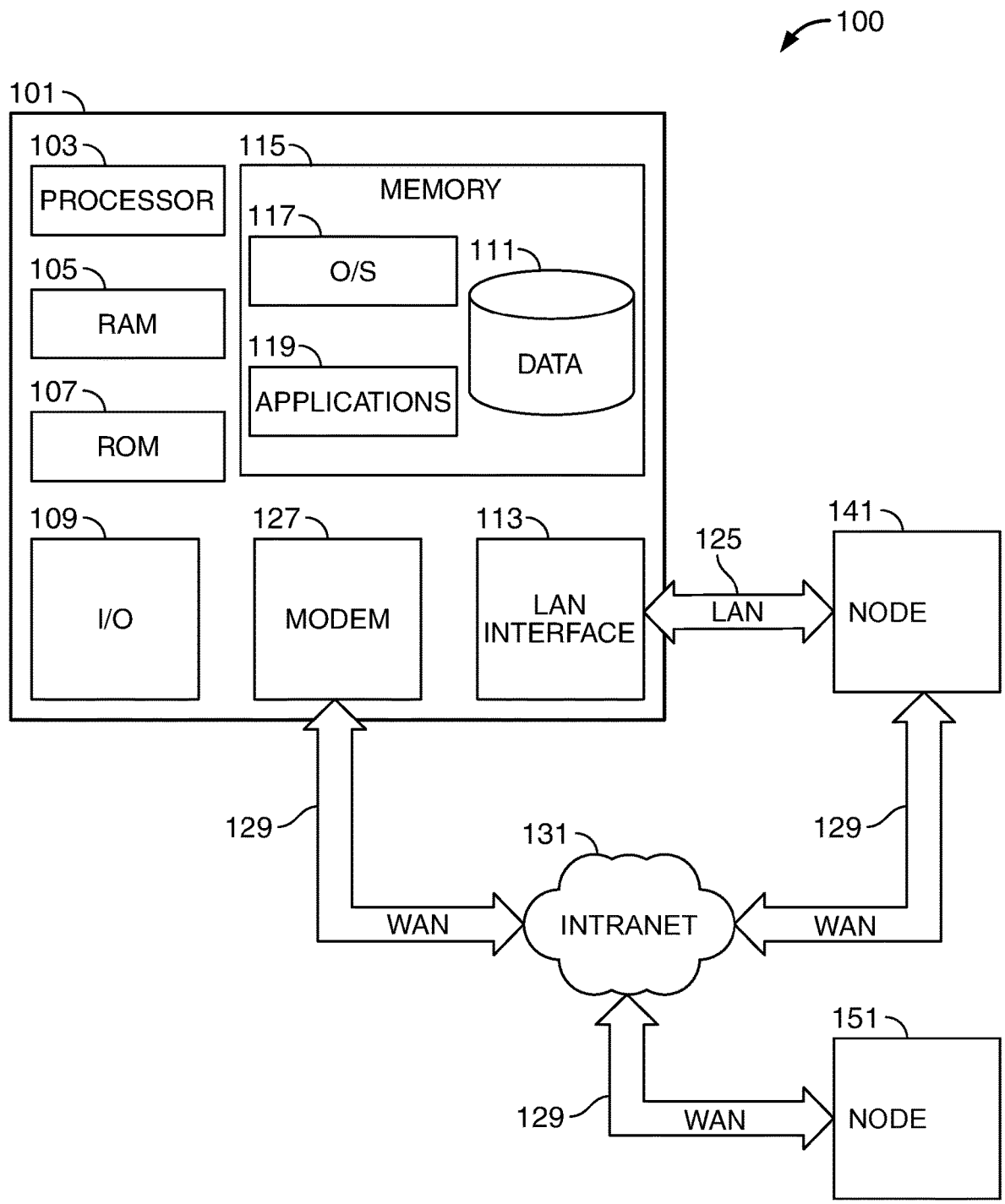
FIG. 1 shows illustrative apparatus in accordance with principles of the disclosure.

Apparatus and methods for dynamically scaling and orchestrating services over a network are provided.

A user may use a computer for various tasks. Each task may require the use of one or more programs, applications, or services. Without connecting to a network, either an internal network (intranet) or the Internet (world wide web), each program/service must be installed on the user's computer. Requiring each program/service to be installed on each user's computer may be costly and the hardware of each computer may limit the number of, or type of programs/services installed. For example, a typical personal computer may struggle rendering a three-dimensional video or performing complex computational fluid dynamics calculations as its processing power and video processing capabilities may not be powerful enough. Further, spreading programs/services across a network may increase collaboration, as well as security.

In this disclosure, a node may be referred to as a computer, and a computer may be referred to as a node. In an embodiment, a node may be a single processor core of a computer, and a computer may have one or more nodes. In an embodiment, a node may be a virtual machine running on a computer and a computer may have one or more nodes. In an embodiment, a computer may include a mobile device such as a smartphone.

A system/apparatus for dynamic scaling and orchestrating network services over a network is provided. In an embodiment, the network may be local. In an alternative embodiment, the network may be a mixture of the Internet and a local network. For example, Internet access may be limited to an email server and a messaging application, and browser access may be highly restricted. The more limited access to the Internet may be, the more secure the network cluster may be. No access to the Internet may be the most secure from malicious actors.

The apparatus may include two or more computers/nodes that form a network cluster. A minimum of two computers/nodes is necessary or a network cluster cannot be formed. A typical embodiment may be an organization with, for example, one hundred employees, each with a personal desktop computer.

Each computer in the network cluster may include a communication link arranged to access the network cluster, i.e., the other computers in the network cluster. Any typical communication protocol, such as wi-fi, LAN, WAN, Bluetooth, cellular communications may be used. The computers may communicate wirelessly or through wires, e.g., CAT5 cables. Peripheral equipment, such as modems and routers may also be used as necessary. In an embodiment, the network cluster may form an internal intranet without access to the Internet, or with limited access to the Internet.

Each computer may include non-transitory memory, for example, ROM or RAM, arranged to store, among other things, network services, the cluster network services, and an operating system. Network services may include, inter alia, applications and software programs accessible over the network. Network services may include any application or program a user desires to access and which is available over the network cluster. For example, a user may request access to a software development program network service, or to a word processing program. Other network services may be a virtual environment, a database, email, internal email, a messenger application, CAD software, designer software, a video rendering program, or any other software that may be accessed over a network.

Each computer should preferably include an agent service as well as a user service which may include executable code arranged to interface with a gateway service. The agent service may invoke each individual network service and should preferably be installed on each computer in the cluster. The user service may be the user's interface with the network cluster. In an embodiment, the user service is the agent service or part of the agent service. In another embodiment the user service is distinct from the agent service. In an embodiment, the user service is a browser or browser extension, similar to a typical web browser. In another embodiment, the user service is a standalone application installed on each computer. The standalone application may be bespoke to an organization or to a particular user. In these embodiments, in order for a user to access the network cluster and network services, the user may open the user service, login using any applicable authentication method (e.g., a username and password, or two-factor authentication), and select a network service to request access to. In an embodiment, the user service may have a graphical user interface ("GUI"), or it may be accessed through command-line instructions. A typical user may prefer GUI access, and a more sophisticated user may prefer a command-line interface. In an embodiment, the user service may display one or the other interface, depending on user preference.

In an embodiment, the agent service may be isolated so that it is not accessible on an http (Internet) domain and cannot be accessed from the Internet as it may only have access to computers in the cluster through local secure sockets. Physically and/or electrically separating the agent service (which should preferably be installed on each computer in the cluster) from the Internet may increase security.

Each computer in the network cluster may also include one or more processor nodes coupled to the memory and arranged to run the agent service and the operating system, communicate between each computer in the network cluster, and execute/operate one or more of the network services. The processor may have one or more processor cores, and in an embodiment, each processor core may act as a separate node within the network cluster. In an embodiment, each processor core may run a separate virtual machine. Each processor core may increase the capabilities of the network cluster, as more processor cores may allow for more network services to run. Similarly, more memory may also increase the capabilities of the network cluster. In an embodiment, the limits of the network cluster may be defined by the physical computer hardware of each computer in the cluster, as well as the latency of each network connection between the computers in the cluster. Limits of the network cluster may include what network services, or how many, may run on the network cluster.

In an embodiment, the system may preferably include two or more director services, each of which may run on a single computer in the network cluster. The director services may be synced with each other. The director services may act as the network administrator, directing the actions of the network and network cluster. At least one director service must be running while the network cluster is operating. Two director services may provide redundancy and may enable the addition of computers/nodes to the network cluster without taking the network cluster down/without downtime.

The director service may be considered a main feature of the system. An analogy to the director service may be the open-source Hadoop NameNode, which is the main portion of HDFS file systems. NameNode may keep the directory tree of all files stored in the HDFS file system, and track the location of each file, even across multiple storage devices and computers. Similarly, the director service may keep a directory of all services running on the network cluster, including their locations. However, unlike NameNode, if the director service crashes or ceases to work, existing network service may continue operating. Further, running two synced director services may ameliorate the effects if one director service crashes.

In an embodiment, the director service may initiate the process of starting up and shutting down each network service. In an embodiment, the director service may also manage the scaling of n-instances of network services automatically. For example, the director service may add or remove instances of network services as needed. If the requests for a particular network service are increasing, the director service may automatically add new instances of that network service. In an embodiment, the director service may use artificial intelligence/machine learning algorithms to predict the required number (and type) of network services at various times.

In an embodiment, the director service may also manage the addition and removal of computers/nodes to the network cluster. In an embodiment, the director service may initiate and create a new gateway service on any new computer/node added to the network cluster. In this embodiment, an agent service must be installed and running on the new computer/node before the gateway service can be created and before the new computer/node can be added to the network cluster. In an embodiment, each director service may be arranged to start, stop, and transfer/move network services from each computer/node in the network cluster.

In an embodiment, the director service may manage the heartbeat responses from each service (network, user, agent, gateway) in the entire cluster. A heartbeat response may be a periodic signal generated by each service that indicates the status and operation of the service. An abnormal heartbeat (e.g., if a service crashes and disappears, its heartbeat will likewise disappear, or if a heartbeat indicates abnormal operation) may trigger various options in the director service. For example, the director service may alert a human network administrator. In another embodiment, the director service may restart the abnormal service. The director service may log the occurrence of the abnormal service.

In an embodiment, the system may include a data store located on one or more of the computers in the network cluster. The data store may preferably include the following features: an accessible key-value storage; a clustered environment; immediate failover and failsafe with significant fault tolerances; and a publisher-subscriber to observer design pattern. With a publisher-subscriber to observer design pattern, any changes in a key-value may be broadcasted to all subscribers of that data. In an embodiment, each service (network, user, agent, gateway, and director) may subscribe to some or all of the data in the data store. For example, the director service may subscribe to all of the data, while the user service may only subscribe to data regarding specific network services. In an embodiment, the director service may be the observer. In an alternative embodiment, the agent or gateway service may also be an observer.

In an embodiment, the data store may be an ETCD data store. An ETCD data store may include the features described above. ETCD is a type of open-source distributed key-value data store that may be used to store information used and needed by distributed systems, such as the network cluster described in this disclosure. Other types of data stores/databases may be used.

The data store may be referred to as a database and may include, as data, one or more configurations for the network cluster, the computers/nodes in the cluster, each agent/user service, each existing and available network service, as well as commands for starting and ending the network cluster or network services. In an embodiment, the data store may also include information and details of each network service running or capable of running on the cluster network.

In an embodiment, the system may include one or more gateway services arranged to interface between each agent service on each computer in the network cluster and each director service. In an embodiment, a gateway service may be installed on each computer/node in the network cluster. In an embodiment, the gateway service may be a part of the agent service installed on each computer/node in the network cluster. The gateway service may act as an access point between each agent service and the rest of the computers on the network cluster.

In an embodiment, the gateway service(s) may act with a round robin or fair scheduler algorithm, or any other appropriate scheduling algorithm, to schedule and direct requests for network services from users/user services. In an embodiment, the gateway service(s) may interact with a load balancer or may include a load balancer. In an embodiment, a reverse proxy server may take the place of a load balancer. In an embodiment, the user service may include a load balancer or reverse proxy server or may connect to a load balancer or reverse proxy server. The load balancer or reverse proxy server may be connected to a browser or client application as part of the user service.

In an embodiment, if a gateway service crashes or fails, other services may be able to re-direct around the gateway service using pre-authorized and pre-configured instructions to request a network service. In an embodiment, if a gateway service crashes or fails, a director service may take over the functions of the gateway service, until the gateway service is re-established.

In an embodiment, the system may also include an authorization service so that only authorized users may access the network cluster and particular network services. Any appropriate authorization method may be used.

In an embodiment, the gateway service(s) may interact with an authorization service to authenticate users and/or requests for network services. To maintain a secure environment and network cluster, only users who have authority to use a particular network service may have access to that particular network service. In an embodiment, the authorization service may have its own data store. In this embodiment, the authorization service may be an external service within the network cluster that may provide options to register users, as well as authorizations for users that have already registered. both the client service and the clients that have registered to access these services. In an alternative embodiment, the authorization service may use the same data store as the other services. In an embodiment, the system may include an encryption controller, which may be a portion of the authorization service. In an embodiment, the non-transitory memory may include executable instructions and at least one datum arranged to authenticate the user and/or the user/agent service. These instructions and datum may be part of the same data store as the remaining services or a separate data store. A separate data store may be more secure.

In an embodiment, any request from a user/user service for access to a network service should include an authorization header proving the user's authorization to access and use the network service requested. If an authorization is not provided, the gateway service or other service may request authorization before providing access. The request may be directed to the user (e.g., request the user enter a username and password) or to the authorization service.

In an embodiment, the system may also include a pool of one or more network services. In an embodiment, the pool may be dynamic. These network services may be located (and running) within the data store and/or within the computers in the network cluster. In an embodiment, the pool may include some or all of the existing network services. In an embodiment, some of the network services may be permanent, while others may always be temporary. The pool of available network services may be highly user specific.

In an embodiment, each director service may be arranged to allow a user to add and remove network services from the pool and add and remove computers/nodes from the network cluster. As the director service is, in effect, in charge of the network cluster, all additions and subtractions of services may have to be approved or run from the director service.

In an embodiment, the director service may be accessed by a user, such as a network administrator, through an operator console. The operator console may have a GUI and/or a command line interface. Some or all functions of the director service may be accessed, started, terminated, or modified through the operator console. In an embodiment, the user may access the network and the network services through a browser or other graphical user interface. In another embodiment, the user may access the network and the network services through a command line interface. The operator console may be installed on any computer in the network cluster. In an embodiment, the operator console may be accessed through a browser/browser extension or other application. In an embodiment, the operator console may be accessed through a mobile device such as a laptop or smartphone.

In an embodiment, the director service(s) may expand or contract the pool of available network services based on an artificial intelligence/machine learning algorithm arranged to predict the network services required by the users of the network cluster. For example, the director service may use AI/machine learning algorithm(s) to determine that at 10:00 a.m. on a typical workday, ten word-processing network services are required, but only one video-processing network service is required. The director service(s) may pre-load network services according to its AI/ML prediction algorithm(s). Any appropriate AI/ML algorithm may be used.

In an embodiment, between three and five gateway services may be necessary for the efficient functioning of the network cluster. Additional gateway services may have diminishing returns and may degrade the performance of the network cluster. The number of gateway services for the most efficient operation may depend on which load balancing/scheduling algorithm is used as each may have a separate point of maximum efficiency. In alternative embodiments, every computer/node in the network cluster may have its own gateway service installed.

In an embodiment, a combination of gateway services may form a gateway services farm. For example, a computer/node may have an 18-core processor, allowing for 18 instances (i.e., each core may run a separate instance in the network cluster). If there are 'n' computers in the cluster each with an 18-core processor, the number of instances may be 18*n. Each computer may have its own gateway service, and the combination of gateway services may form a gateway services farm. In an embodiment, an instance may handle 10,000 connections per second, but may be limited by the gateway service connections and/or a load balancer/reverse proxy server.

In an embodiment, each computer/node on the network cluster includes its own unique IP address or other type of address. Unique addresses may be necessary for the efficient functioning of the network cluster and may be necessary to point each computer and/or user/agent service to the correct location for a desired network service. These addresses may be stored in the data store, the gateway service(s), the director service(s), in a combination thereof, or any other suitable location. In an embodiment, the address may be changed by the director service, any other service, or by an administrator, if necessary. Addresses may be manually assigned or assigned through an algorithm. In an embodiment, addresses may be hardwired to a specific computer and unable to be changed. For example, every computer may have a unique MAC address, and that MAC address may be used by the system in lieu or in addition to any other address. In an embodiment, addresses may be dynamic.

In an embodiment, one or more computers in the network cluster may be a virtual machine formed from a computer in the network cluster. A virtual machine may have its own unique IP or other address. Virtual machines may increase efficiency of a user or the system. For example, if a computer has 10 processor cores, it may be able to form up to 10 virtual machines, each virtual machine in turn forming one node in the network cluster.

In an embodiment, the system may include a load balancer and/or reverse proxy server. In an embodiment, the gateway service may include a load balancer and/or reverse proxy server. In an embodiment, the user service may include a load balancer and/or reverse proxy server. In another embodiment, the user service may connect to a load balancer and/or reverse proxy server, without those components being included within the user service.

A load balancer or proxy/reverse proxy server may distribute/balance connections and other loads on the system, and components of the system, to prevent system overload. For example, if an instance can theoretically handle 10,000 connections per second, the hardware may be unable to handle that many operations without slowing down or increasing temperature. Therefore, a load balancer or proxy/reverse proxy server may limit the number of connections to preserve computing resources and maximize efficiency. Any appropriate load balancer and/or reverse proxy server algorithm may be utilized.

A method for dynamically scaling and orchestrating network services on a cluster of two or more computers is provided. The method may include, inter alia, forming a network cluster by starting a user service on each computer in the cluster, starting an agent service on each computer in the cluster, starting an authorization/authentication service on one or more computers in the cluster, starting a gateway service on one or more computers in the cluster, and starting a director service on one or more computers in the cluster. In an embodiment, multiple gateway services and director services may be started. In an embodiment, a minimum of two director services may be required, for backup and redundancy or other reasons.

In an embodiment, the various services may be started from a user/administrator console or operator console. The network cluster may be designed to continue operating indefinitely unless a crash or bug occurs. If multiple director services (a minimum of two) are started within the network cluster, additional computers/nodes may be added or removed without ceasing operation of the network cluster. The console may be located/installed on one of the computers in the cluster. In an embodiment, the user/administrator console may be located outside of the computers in the cluster. The console may have a GUI and/or a command line interface. Some or all functions of the director service may be accessed, started, terminated, or modified through the console. In an embodiment, the console may be accessed through a browser/browser extension or other application. In an embodiment, the console may be accessed through a mobile device such as a laptop or smartphone.

The method may include receiving, at the gateway service, a request for one or more network services from the user. The request may include one or more instructions, for example, one or more command line commands to execute the network service, one or more configurations required for the network service to run properly, or one or more prerequisite software programs that the network service may require. The request may include an authorization header.

The method may include redirecting the request for the network service to the authorization service to authenticate the user and user service. The redirection may occur when the request is lacking an authorization header. In an embodiment, the redirection may occur even if there is an authorization header, to check the validity of the authorization header. The method may include the authorization service providing an appropriate authorization header with the request and sending the request back to the gateway service with the appropriate (and approved) authorization header.

Any appropriate authorization method may be used. For example, a username and password, a one-time passcode, a PIN, biometric logins (such as a fingerprint or facial recognition), two-factor authentication, or the like.

The method may include the gateway service determining if an instance of the network service requested by the user/user service is available on one of the computers in the cluster. The instance of the network service may be located within a dynamic services pool. If an instance is available, the gateway service may provide the user service access to the instance of the requested network service. An instance of the network service may be considered available if it is idle (i.e., no other user or user service is using the instance) and running on any computer in the cluster. In an embodiment, the gateway service may query the director service to determine if the instance is available or not. In an embodiment, the director service may query various agent services to determine if the instance is available or not. In another embodiment, the director service may query an agent service (regarding creating a new instance) if the director service determines that an instance is not available.

If an instance of the requested network service is not available, the gateway service may request that the director service create a new instance of the network service on any available computer in the cluster. A computer in the cluster may be considered available when it has enough free computing resources to run the network service. For example, the requested network service may require 1 gigabyte ("gb") of RAM and a dedicated processor core to properly run. Only if a computer in the cluster has 1 gb of free RAM and an unused processor core may it be considered available to run the requested network service. The director service may query each computer in the cluster, through the agent service on each computer, until it discovers a computer available to run the requested network service. The director service may create a new instance of the network service by starting the network service on any available computer. In an embodiment, the director service may direct the agent service on an available computer to create the new instance.

The method may include providing the user service with access to the new instance of the requested network service and connecting the user service to either the existing instance of the requested network service or the new instance of the network service. In an embodiment, access may be controlled through the gateway service. In another embodiment, after access is granted, the gateway service may delegate the access power to an agent service. In an embodiment, the agent service may be the agent service on the user's computer.

The method may include registering the gateway service as an observer of the new instance so that the gateway service can observe and ensure the new instance of the requested network service is running properly. The method may also include purging the authorization header and the instructions, i.e., purging the request, from the gateway service to free up the gateway service to process further requests. The method may also include re-allocating the authorization header and the instructions, i.e., the request, to the user service for any number of reasons. In an embodiment, the authorization header and instructions, as well as access to the instance, may be delegated to an agent service. In an embodiment, the agent service may be the agent service on the user's computer.

In an embodiment, the cluster, and/or one or more of the computers within the cluster may be disconnected from the Internet. In an embodiment, the cluster, and/or one or more of the computers within the cluster may be connected to the Internet, but that access may be limited. For example, internet access may be limited to an email server, but no other access may be granted.

In an embodiment, when an instance of the requested network service is not available within the cluster, the method may include the director service querying a data store for one or more details of the requested network service. The details may include one or more commands needed to initiate the network service, one or more configurations required by the network service, and any prerequisite software needed by the network service. If there is prerequisite software, the director service may instruct a computer in the cluster to load that prerequisite software so that the instance of the network service may run properly. For example, if a software development network service requires certain libraries to run, the director service may discover the identity (and location) of those libraries from the data store, and pre-load the libraries before starting the requested software development network service.

In an embodiment, the method may include the director service ensuring that enough instances of the network service are present in the cluster. The requirement of the number of instances may be determined by the number of requests by user services for that particular network service. Any other appropriate method to determine the number of required network service instances may be used, including AI/ML predictive algorithms. The method may include initiating/starting the new instance of the requested network service on any available computer in the cluster, updating the data store with one or more details regarding the new instance of the network service, and providing the user service with the details of the new instance of the network service so that the user service may connect with and use the new instance. The details of the new instance of the network service may include, inter alia, the location of the new instance of the network service in the cluster (i.e., which computer, and where on that computer, the new instance is running), and information permitting the user service to connect to the new instance of the network service. Such information may include, inter alia, authorization details and IP or other address(es).

In an embodiment, if the director service determined that no instance of the requested network service is available and that there are no available computers in the cluster to initiate a new instance, the method may include informing the user or user service that there are no available computers/resources in the cluster and the requested service cannot run. This message may take the form of a time-out.

In an embodiment, the method may include terminating the network service when requested by the user service or user.

In an embodiment, the method may include terminating the network service when the network service is idle for a pre-determined period of time. A network service may be considered idle if it is available for use but no request for its use has been received by the gateway service in a certain amount of time. The amount of time may depend on the service (including the resources necessary to run that particular service) or on the use of the network cluster as a whole. In an embodiment, the pre-determined period of time may be one minute, or one hour. In an embodiment, the pre-determined period of time may be dynamic, and may be adjusted by the director service based on various factors, including computer load. In an embodiment, the director service may use AI/ML algorithm(s) to adjust the pre-determined period of time.

In an embodiment, the method may include terminating any idle network service when a computer is unavailable to run the requested network service. Terminating idle service (s) may free up enough resources to run the requested network service. In an embodiment, if no new requests for network services are being received, no idle network services may need to be terminated. For example, if there are no users (e.g., overnight), there may be no need to terminate any services.

In an embodiment, the method may include adding a new computer/node to the cluster. In an embodiment, a new computer/node may be added when a computer is unavailable to run the network service, thereby providing enough resources to run the requested network service. A new computer/node may be added without shutting down the cluster, i.e., a new computer/node may be added on the fly.

In an embodiment, the method may include removing a computer/node from the cluster. This may be accomplished without shutting down the cluster. In an embodiment, when removing a node from the cluster, the gateway service or load balancer/reverse proxy server balancer may remove the node from a list of computers/nodes comprising the cluster. The director service may then initiate a shutdown of all services from the computer/node by informing the agent service or gateway service to start the shutdown operation. The agent/gateway service may initiate a shutdown operation for any network services running in that computer/node and also update the data store with the network service status. After the network services have been shut down, the director service may remove the entry for the computer/node from the data store using/ns/cluster/node and removes the tree information for /ns/cluster/node/node_1 or any other appropriate method.

In an embodiment, the method may include the gateway service requesting the director service initiate a new instance of the network service when the gateway service has received an amount of requests for the network service within a pre-determined time period that exceeds a pre-determined threshold. For example, if the gateway service has received 10 requests for a particular network service within the previous five minutes, it may request that the director service initiate a new instance of that particular network services to provide a buffer for future requests for that particular network service.

In an embodiment, the method may include the gateway service requesting the director service initiate a new instance of the network service when a resource load of the network service exceeds a pre-determined threshold. For example, if a network service is using too much RAM or too much CPU, a new instance of the network service may help alleviate some of that resource load. The agent service, gateway service, and/or director service may monitor the CPU/memory usage of a particular network service or computer/node.

In an embodiment, the method may include the director service transferring a network service from a first computer in the cluster to a second computer in the cluster when a resource load of the first computer exceeds a pre-determined threshold. In this embodiment, a transfer may be warranted when all of the services running on a computer (not just one network service) are using too many of the resources of that computer.

In an embodiment, the method may include syncing a first director service running on a first computer in the cluster with a second director service running on a second computer in the cluster. In an embodiment, the method may include syncing each director service running on separate computers in the cluster with each other, up to 'n' director services. Syncing director services may allow for computers/nodes to be added or removed from the network cluster on the fly, without taking the network cluster offline. In this embodiment, one director service is updated with the removal/addition, and when the removal/addition is complete, that director service is synced with the other director service(s), so that each director service now has the same information.

In an embodiment, the method may include syncing/updating the data store every time a network service is terminated or added, and every time a computer/node is added/removed from the network cluster. In an embodiment, the method may include syncing/updating one or more of the services (i.e., agent, gateway, director, user) every time a network service is terminated or added, and every time a computer/node is added/removed from the network cluster. For example, if a new network service is available, the user service may be updated to include a link (icon or any other type) to that new network service, and a user may request access to that new network service.

In an embodiment, the method may include a user accessing the user service through a graphical user interface, such as a browser or bespoke application, or through a command line interface.

In an embodiment, the method may include the director service analyzing the cluster through an artificial intelligence algorithm. Analysis may include, inter alia, resource management, load management, predictive network service creation, and predictive network service termination. Any appropriate AI/ML algorithm may be used.

Table 1 contains exemplary configuration values for an exemplary cluster of computers/nodes and services in accordance with principles of the disclosure. These configurations may be stored in a data store and may be modified as necessary.

TABLE 1

| Key / Folder | Value | Exemplary Description |
|---|---|---|
| /com.company.db | | Namespace |
| /com.company.db /cluster1 | | Cluster within a namespace |
| /com.company.db/cluster1 /nodes/names | [ node_1, node_2, .. node_n ] | String of each computer/node in the cluster |
| /com.company.db/cluster1 /nodes/ global_config | cores: 18, memory: 128G, service_id: "zk1234", env :     PATH : "",     PYTHON_PATH : "",     "conda_base" : "/conda/base/bin" | Yaml or other type of string value. E.g., global/expected configuration for all computers/nodes in the cluster. |
| /com.company.db/cluster1 /nodes/node_1/ config | service_id: "zk5678, env :     PATH: "" | Yaml or other type of string value. In addition, local configuration if any. Global configuration may be overridden by these key value pairs. |
| /com.company.db/cluster1 /services/names | [ "service_1", "service_2", "service_3" ] | Json or other type of string. List of all services that have registered/are running on the cluster. |
| /com.company.db/cluster1 /services/config/global_config | db.ssl :     ssl_cert : "/app/.../ca.cert/"     ssl_key : "/app/.../a.key" db.oracledb :     dsn : "xyz" db.mongodb :     mongo_uri : "qwerty" db.director :     node : [ node_5, node_8 ]     port : 45012 | Yaml or other type of string. Configuration file information such as database connections, ssl certs, or other information necessary for each service. |
| /com.company.db/cluster1 /services/ config/service_gtw | db.gateway_service :     Port : 45678 | |
| /com.company.db/cluster1 /services/config/service_gtw/ preload | Pip install -y python=3.8.5, tesseract=4.0.1.... | Any libraries that need to be preloaded and installed that will be executed on the command line of that computer/node |
| /com.company.db/cluster1 /services/ service_gtw/exec | { "command" : "python -m dbsvcgtw.app -config ", conda_env : "services_v1", user : "local / service" env : { PATH : "", JAVA_PATH : "", GCC : "7.3.0" } } | Json or other type of string of all execute commands that will start a service on a computer/node. May include a user or service id. |
| /com.company.db/cluster1 /runtime/services/ service_gtw | [ { node : "node_2", port : aaaaa, pid : bbbb },   { node : "node_3", port : ccccc, pid : dddd } ] | List of all computers/nodes and ports where a particular service is running. |

TABLE 1-continued

| Key / Folder | Value | Exemplary Description |
| --- | --- | --- |
| /com.company.db/cluster1/runtime/services/service_1/node | [ { node : "node_3", port : eeeee, pid : ffff }, ] | List of all computers/nodes and ports where a particular service is running. |
| /com.company.db/cluster1/node/node_2/ runtime | [ { service : "service_gtw", port : aaaaa, pid : bbbb }, ] | List of all services running on a particular computer/node. |
| /com.company.db/cluster1/node/node_3/ runtime | [ { service : "service_gtw", port : ccccc, pid : dddd }, { service : "service_1", port : eeeee, pid : ffff } ] | List of all services running on a particular computer/node. |

It will be understood that these are simple exemplary configurations that may be modified as necessary depending on names, languages used, and other requirements. Other configurations are not included in the table above.

Table 2 contains an exemplary pseudo code for an embodiment of the user/agent service. Comments within the code may be delineated by // or /*.

TABLE 2

Agent Service

```
create_service(full_service_name) -> AgentResponse:
  /* called by DirectorService */
  // read configuration from data store/etcd (key value store)
  config = etcd.read_config("/services/config/full_service_name")
  command_line = config.get_command_to_execute( )
  // get port number for service to execute. This can be provided in configuration or
     create a new unused port number
  port_number = get_port_number(config)
  // Merge command_line with port number
  command line = add_port_number(port_number)
  // build environment parameters such as path, virtual environments for python
     programs, java jar file locations, .net environment parameters, C++ gcc path info
     and other relevant information for service to execute in a node
  new_environment_parameters = build_env_params(config)
  // get the user context under which this process will execute
  context_user_id = get_and_validate_user_context(config)
  // create sub process
  child_process_id = create_sub_process(command_line,
     env=new_environment_parameters, user=context_user_id, stdout=output_log_file,
     stderr=error_log_file)
  //Wait for child process to spawn successfully. If error, respond with error
  If child_process_id is successful:
     //update signals to watch for service terminations and other housekeeping
        operations
     update_watch_information(full_service_name, port_number, config)
     return hostname, port_number, child_process_id
  Else:
     return error_codes, full_service_name
shutdown_service(full_service_name, user_context) -> status
  /* called by DirectorService */
  // read the runtime information of service from etcd (key value store)
  runtime_services_list = etcd.read_runtime_list("/runtime/services/full_service_name")
  //find the specific runtime_info from the list
  runtime_service = find_runtime_for_this_host_and_user_context(runtime_info_list)
  //runtime_service has hostname, process_id, and port number. Send os.kill(SIGTERM)
     graceful shutdown
  os.send_graceful_shutdown_information(process_id)
  // wait for child process to shutdown
  status = Wait_for_shutdown_completion(process_id, port_number)
  return status
shutdown_all_services( ) -> status_list
  /* called by DirectorService */
  // read all runtime services from etcd (key value store).
  runtime_info_list = etcd.read_runtime_info('/runtime/nodes/current_hostname")
  foreach runtime_info in runtime_info_list:
     status = call_shutdown_service (full_service_name, user_context)
     append_to_status_list(status)
  return status_list
on_child_service_termination(process_id / runtime_info)
```

TABLE 2-continued

Agent Service

```
/* This notification will either come from the signals when sub process gets terminated
    or when a watcher/monitor in data store will send a notification */
// child process will send processId
If process_id:
    // child might have already updated data store with the exit information
    runtime_info = cache.get_runtime_info(process_id)
    runtime_exists = ectd.check_runtime(runtime_info)
    If runtime exists is false:
        Ectd.delete(runtime_info)
    remove_cache(runtime_info)
else if runtime_info:
    // this will be called only when explicitly asking the data store to watch for any changes
        in this runtime key
    remove_from_cache_if_exists(runtime_info)
    etcd.delete(runtime_info)
```

It will be understood by a person of ordinary skill in the art that the above pseudo code is simply exemplary of possible code functions of an agent service as described in this disclosure. Comments within the pseudo code may be indicative of possible embodiments as described in this disclosure.

Table 3 contains an exemplary pseudo code for an embodiment of the director service. Comments within the code may be delineated by // or /*.

TABLE 3

Director Service

```
get_service_details (full_service_name, user_context)
    /* this service gets called from Gateway Service when the service with the current
        user_context is not available in the gateway cache. * /
    // check etcd/data store (key value store) for the runtime
    runtime_service =
        ectd.get_runtime_info("/runtime/services/full_service_name/user_context")
    if exists runtime_service:
        return runtime_service.details( )
    else:
        //call AgentService to create the service
        service_config = etcd.get_service_config("/services/config/full_service_name")
        // get runtime_info of a specific agentservice
        agent_hostname = analyze_where_to_run_service(service_config)
        runtime_agent =
            etcd.get_agent_runtime("/runtime/services/AgentService/agent_hostname")
        agent_inputs = prepare_agent_inputs(service_config)
        agent_response = runtime_agent.create_service (agent_inputs)
        runtime_service = get_runtime_service_details(agent_response)
    return runtime_service.details( )
initiate_shutdown(entire_cluster, specific node, specific
        service_with_user_context, specific_service)
    /* shutdown of service can be initiated for a specific service with user context, all
        service instances of a specific service, specific node (for bringing down the node
        for maintenance purposes) */
    // if entire cluster to be shutdown
    agent_runtime_list = etcd.get_agent_runtime('/runtime/services/AgentService')
    // create a map of each agent of a node => { nodename : agent_details (process_id and
        port) }
    agent_map = create_agent_map(agent_runtime_list)
    if entire_cluster:
            runtime_service_list = etcd.get_runtime_services('/runtime/nodes')
    if specific_node_name:
            runtime_service_list =
        etcd.get_runtime_services('/runtime/nodes/specific_hostname')
    if specific_service:
        runtime_specific_list =
        etcd.get_runtime_services('/runtime/services/full_service_name ')
    if specific_service_with_user_context:
        runtime_specific_list =
        etcd.get_runtime_services('/runtime/services/full_service_name/user_id')
    foreach runtime_service from runtime_service_list:
        agent_service = agent_map.get(runtime_service.hostname,
            runtime_service.user_context)
        status = agent_service.shutdown(runtime_service.full_service_name,
```

TABLE 3-continued

| Director Service |
|---|

```
      runtime_service.user_context)
      status_list = append_to_list(status)
   return status_list
update_service_config (service_details)
   /* registers the service configuration. This is usually called from the operator console
      or from the front-end flow, when new services are to be registered in this cluster */
   If service_details is yaml file:
      service_details = Convert yaml to Json
   service_config = etcd.check_if_exists(service_details)
   If exists service_config:
      new_service_config = merge(service_details, service_config)
      status = ectd.update_service_config(new_service_config)
   Else:
      status = etcd.append_service_config(service_config)
   return status
```

It will be understood by a person of ordinary skill in the art that the above pseudo code is simply exemplary of possible code functions of a director service as described in this disclosure. Comments within the pseudo code may be indicative of possible embodiments as described in this disclosure.

Table 4 contains an exemplary pseudo code for an embodiment of the gateway service. Comments within the code may be delineated by // or /*.

TABLE 4

| Gateway Service |
|---|

```
Main Flow - RequestHandler
   /* This is the main flow of the service that handles all the requests from any client/user
      service */
   listen_for_new_requests( )
   header_info = read_header_data(request_handler)
   if not exists runtime_auth:
      runtime_auth = cache.get_authorization_service( )
      if not exists runtime_auth:
         runtime_director = cache.get_director_service( )
         if not exists runtime_director:
            runtime_director = etcd.get_runtime_service
      ('/runtime/services/DirectorService')
            update_cache(runtime_director)
         auth_service_params =
      etcd.get_auth_service_config('/services/config/AuthService')
         runtime_auth = runtime_director.get_service_details(auth_service_params)
         update_cache(runtime_cache)
   authorized = check_authorization(request_info.auth_token( )
   if not authorized:
      return "User / App Not authorized for this service"
   runtime_service = cache.get_runtime_service(request_info.service_name)
   if not exists runtime_service:
         service_params = etcd. get_runtime_service
      ('/services/config/service_name)
         runtime_service = runtime_director.get_service_details(service_params)
      update_cache(runtime_service)
      update_watch(runtime_service)
   method = runtime_service.get_method(request_info.method_name)
   // runtime_service provides the hostname and port number where the service is running
   //There may be four or more types of requests and responses on a service method//
   //1. One request returning one response//
      Response = call_runtime_service.method.execute(request.body)
   // 2. One request returning multiple response - similar to returning images to a web
      browser//
      Response_list = call_runtime_service.method.execute(request.body)
   //3. Multiple requests returning a single response similar to uploading a file with
      multipart/form-data//
      Response = call_runtime_service.method.execute(request_queue from client)
   //4. multiple requests generating multiple response; similar to interactive video
      streaming //
      Response_queue = call_runtime_service.method.execute(request_queue from
      client)
```

TABLE 4-continued

Gateway Service

```
Metrics_server.update(stats)
initiate_shutdown(entire_cluster, specific node, specific service_with_user_context,
    specific_service)
  /* shutdown of service can be initiated for a specific service with user context, all
    service instances of a specific service, specific node (for bringing down the node for
    maintenance purposes), or other reasons */
  // if entire cluster to be shutdown
  agent_runtime_list = etcd.get_agent_runtime('/runtime/services/AgentService')
  // create a map of each agent of a node => { nodename : agent_details (process_id and
    port) }
  agent_map = create_agent_map(agent_runtime_list)
  if entire_cluster:
      runtime_service_list = etcd.get_runtime_services('/runtime/nodes')
  if specific_node_name:
      runtime_service_list =
    etcd.get_runtime_services('/runtime/nodes/specific_hostname')
  if specific_service:
    runtime_specific_list =
    etcd.get_runtime_services('/runtime/services/full_service_name ')
  if specific_service_with_user_context:
runtime_specific_list =
    etcd.get_runtime_services('/runtime/services/full_service_name/user_id')
    foreach runtime_service from runtime_service_ list:
      agent_service = agent_map.get(runtime_service.hostname,
      runtime_service.user_context)
      status = agent_service.shutdown(runtime_service.full_service_name,
      runtime_service.user_context)
      status_list = append_to_list(status)
    return status_list
update_service_config (service_details)
    /* registers the service configuration. This is usually called from the operator console or
      from the front-end flow, when new services are to be registered in this cluster */
    If service_details is yaml file:
      service_details = Convert yaml to Json
    service_config = etcd.check_if_exists(service_details)
    If exists service_config:
      new_service_config = merge(service_details, service_config)
      status = ectd.update_service_config(new_service_config)
    Else:
      status = etcd.append_service_config(service_config)
    return status
```

It will be understood by a person of ordinary skill in the art that the above pseudo code is simply exemplary of possible code functions of a gateway service as described in this disclosure. Comments within the pseudo code may be indicative of possible embodiments as described in this disclosure.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of this disclosure, FIG. 1 shows an illustrative block diagram of system 100 that includes a computer/node 101 connected to other nodes 141 and 151. Node 101 may alternatively be referred to herein as a "computing device." Elements of system 100, including node 101, may be used to implement various aspects of the systems and methods disclosed herein. A "user" of system 100 or node 101 may include other computer systems or nodes, or a human in the loop.

Node 101 may have a microprocessor 103 for controlling the operation of the device and its associated components, and may include RAM 105, ROM 107, input/output module 109, and a memory 115. The microprocessor 103 may also execute all software running on the node 101—e.g., the operating system 117 and applications 119 such as the user service, agent service, gateway service, director service, or network services. Other components commonly used for computers, such as EEPROM or Flash memory or any other suitable components, may also be part of the node 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the user service, agent service, gateway service, director service, or network services) along with any other data 111 (e.g., the data store) needed for the operation of the system 100. The data may also be stored in cache memory, or any other suitable memory. Alternatively, some or all of computer executable instructions (alternatively referred to as "code") may be embodied in hardware or firmware (not shown). The microprocessor 103 may execute the instructions embodied by the software and code to perform various functions.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

In an embodiment of the node 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, or network interface through which a user of node 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown). The input and output may be related to using network services and a user service through the processor 103 and intranet 131.

System 100 may be connected to other systems, computers, nodes, and/or an intranet 131 via a local area network (LAN) interface 113.

System 100 may operate in a networked environment supporting connections to one or more remote computers and nodes, such as nodes 141 and 151, including, in general, remote nodes that are not connected to node 101 through the Internet and "cloud". References to the "cloud" in this disclosure generally refer to the Internet, which is a worldwide network. "Cloud-based applications" generally refer to applications located on a node remote from a user, wherein some or all of the application data, logic, and instructions are located on the internet and are not located on a user's local device. Cloud-based applications may be accessed via any type of internet connection (e.g., cellular or wi-fi). However, one object of this disclosure is to provide "cloud" computing benefits to non-cloud connected computers/nodes. Therefore, references to the "cloud" may refer to cloud benefits and not the actual cloud as is understood in the art.

Nodes 141 and 151 may be computers/nodes that include many or all of the elements described above relative to system 100. Not every node in a network cluster needs to be identical, although identical nodes may be more efficient. The network connections depicted in FIG. 1 include a local area network (LAN) 125 and a wide area network (WAN) 29 but may also include other networks. Node 101 may include a network interface controller (not shown), which may include a modem 127 and LAN interface or adapter 113, as well as other components and adapters (not shown). When used in a LAN networking environment, node 101 is connected to LAN 125 through a LAN interface or adapter 113. When used in a WAN networking environment, node 101 may include a modem 127 or other means for establishing communications over WAN 129, such as an intranet 131. The modem 127 and/or LAN interface 113 may connect to a network via an antenna (not shown) or physical cable (such as a CAT5 cable). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-node configuration to permit a user to access services/instances from other nodes, such as nodes 141 and 151. The networked node may transmit data to any other suitable computer system in the network. The networked node may also send computer-readable instructions, together with the data, to any suitable computer system in the network. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be services such as the user service, agent service, gateway service, director service, or network services. The various tasks may be related to using other nodes on the network to run network services and linking nodes in a network cluster together, increasing functionality similar to cloud applications, without the cloud.

Node 101 may also include various other components, such as a battery (not shown), speaker (not shown), a network interface controller (not shown), and/or antennas (not shown).

Node 151 and/or node 141 may be portable devices such as a laptop, cell phone, Blackberry™, tablet, smartphone, or any other suitable device for receiving, storing, transmitting and/or displaying relevant information that may act as a node in the network cluster.

Any information described above in connection with data 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, servers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. In a preferred embodiment, the invention may also be practiced in distributed computing environments where services are instance on other nodes that are linked through a local communications network. In this embodiment, remote may not mean physically remote (i.e., the separate nodes may be next to each other, or down a hallway), but may simply mean physically separate, but connected through a network connection.

Figure 2:
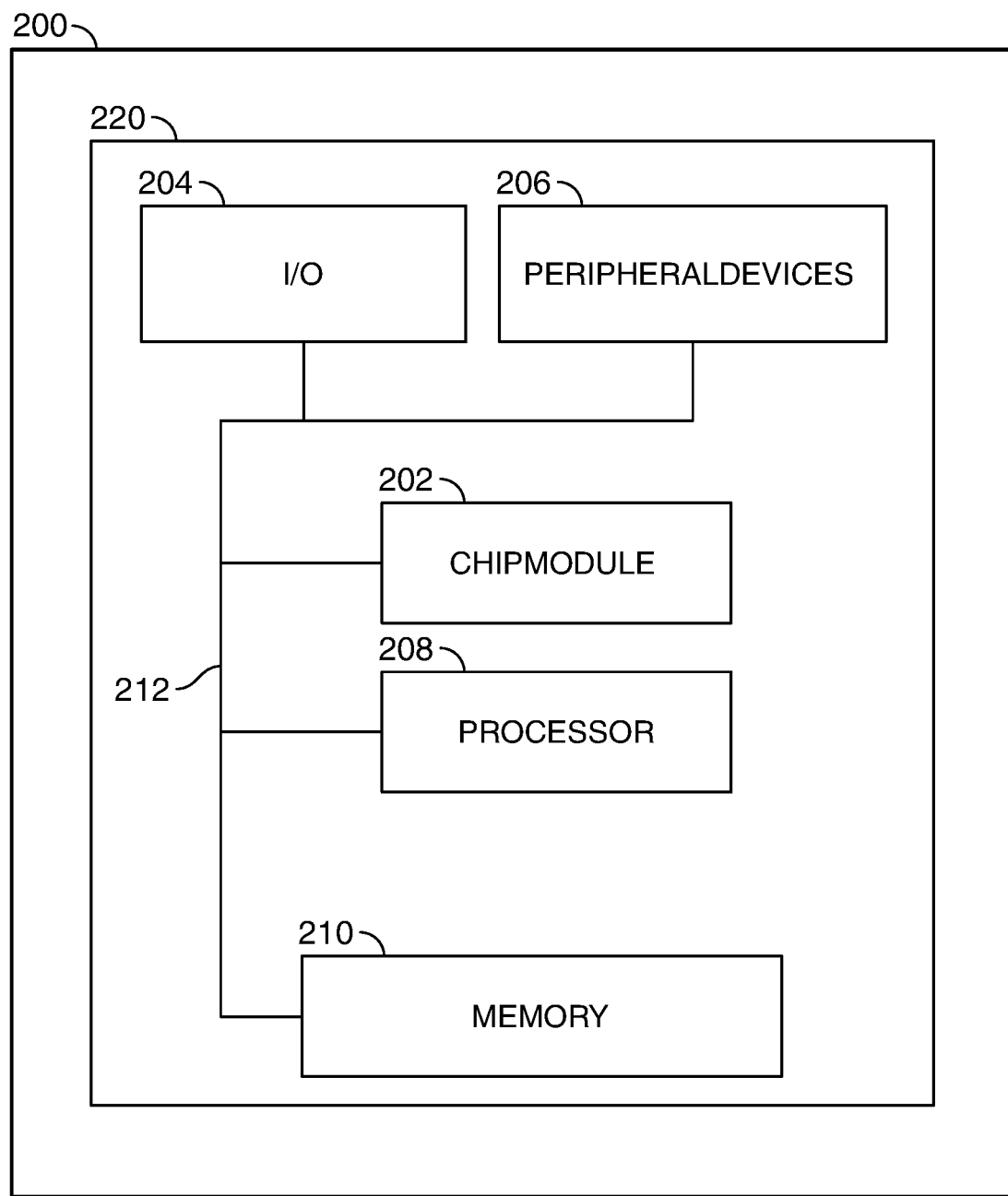
FIG. 2 shows illustrative apparatus in accordance with principles of the disclosure.

FIG. 2 shows illustrative apparatus 200 that may be configured in accordance with the principles of the disclosure. Apparatus 200 may be a computer/node. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 206, which may include batteries and chargers, counter timers, real-time timers, power-on reset generators or any other suitable peripheral devices; logical processing device 208, which may compute structural information and structural parameters of an application; and machine-readable memory 210.

Machine-readable memory 210 may be configured to store in machine-readable format: machine executable instructions (which may be alternatively referred to herein as "computer instructions" or "computer code"), applications, signals, recorded data, and/or any other suitable information or data.

Components 202, 204, 206, 208 and 610 may be coupled together by a system bus or other interconnections 212 and may be present on one or more circuit boards such as 220. In some embodiments, the components may be integrated into a single chip. The chip may be silicon-based.

Figure 3A:
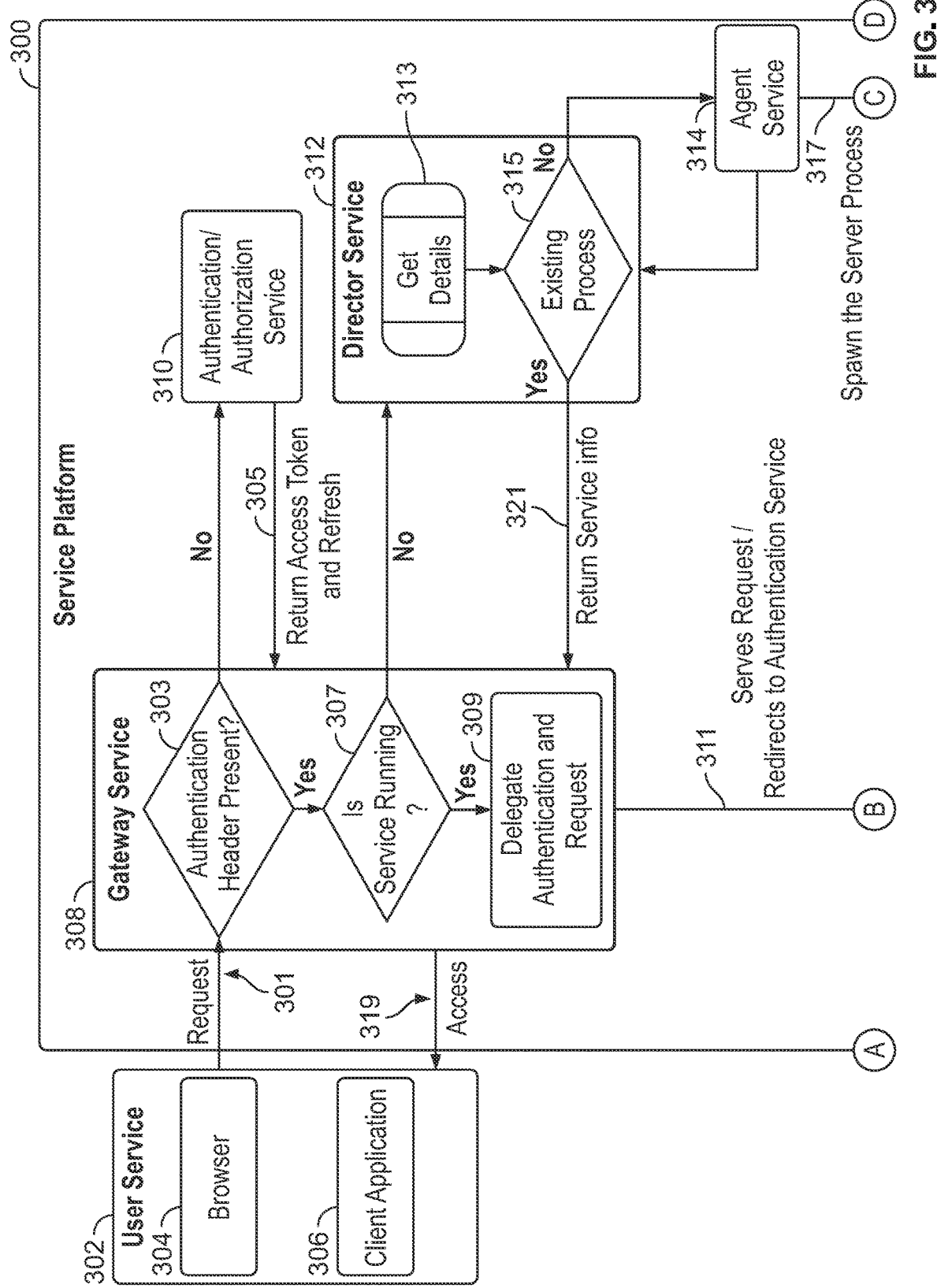
FIGS. 3A-3B show an illustrative process flowchart in accordance with principles of the disclosure.
Figure 3B:
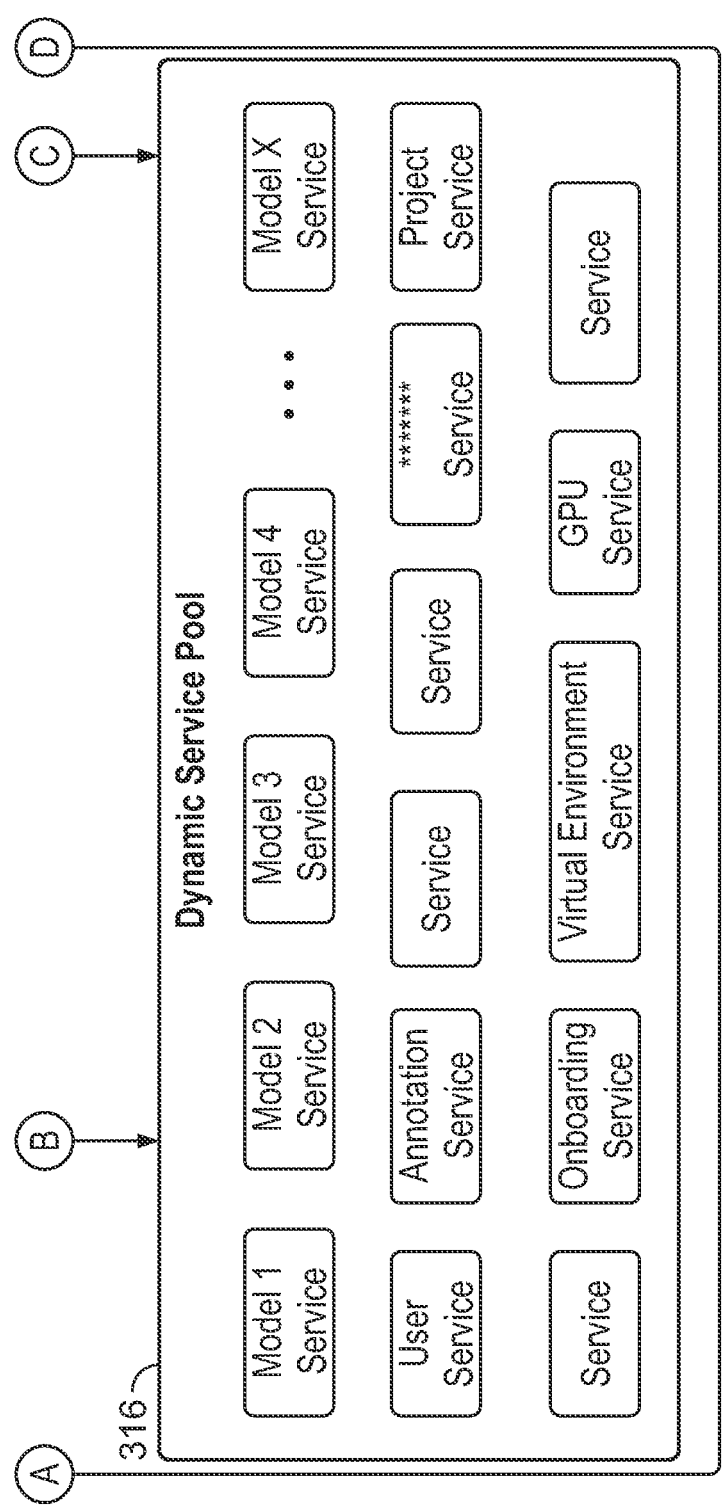

In accordance with principles of the disclosure, FIGS. 3A-3B show an illustrative process flowchart with apparatus and steps. FIG. 3B is a continuation of FIG. 3A, and references to FIG. 3 may include both FIGS. 3A and 3B. Services platform 300 may include gateway service 308, authorization service 310, director service 312, agent service 314, and dynamic network service pool 316. User service 302 may be a part of or separate from (but connected to) services platform 300.

Methods may include some or all of the odd-numbered method steps numbered 301 through 321. Methods may include the steps illustrated in FIG. 3 in an order different from the illustrated order. The illustrative method shown in FIG. 3 may include one or more steps performed in other figures or described herein and not shown in FIG. 3. Steps 301 through 321 may be performed on the apparatus shown in FIGS. 1 and 2, the apparatus shown by even-numbers 300 through 316, or other apparatus.

User service 302 may include one or both of a browser 304 and a client application 306. Either or both browser 304 and client application 306 may present a graphical or command line user interface for a user (not shown) to interact with services platform 300 and request access to a network service within the dynamic network services pool 316.

At step 301, a user, through the user service 302, may send a request for a network service to the gateway service 308. At step 303, the gateway service may check to see if an authorization header is present in the request. If an authorization header is absent, the gateway service 308 may check with the authorization service 310, and at step 305, the authorization service 310 may return the request to the gateway service 308 with an appropriate authorization header.

At step 307, after the request for a network service has an appropriate authorization header, the gateway service 308 may check to determine if the requested network service is already running in the dynamic services pool 316. If the network service is running, at step 309 the gateway service 308 may delegate the authorization and request and serve the request to the services pool 316. At step 311, the dynamic services pool 316 may grant the gateway service 308 access to the requested service. At step 319, access to the requested network service may be granted to the user service 302 by the gateway service 308.

At step 307, if the gateway service 308 believes the requested service is not running in the services pool 316, the gateway service 308 may inform the director service 312. The director service 312, at step 313, may then retrieve the details of the request and determine if the service/process exists at step 315. If the director service determines that the requested service actually exists in the pool 316, it may inform the gateway service at step 321.

At step 317, if the requested service/process is not in the pool 316, an agent service 314 may spawn and create the service/process and place it in the pool 316. Once the requested service is in the pool 316 (which contains exemplary services), the pool 316 may grant access to the gateway service at step 311, and the gateway service 308 may grant access to the user service 302 at step 319.

Figure 4A:
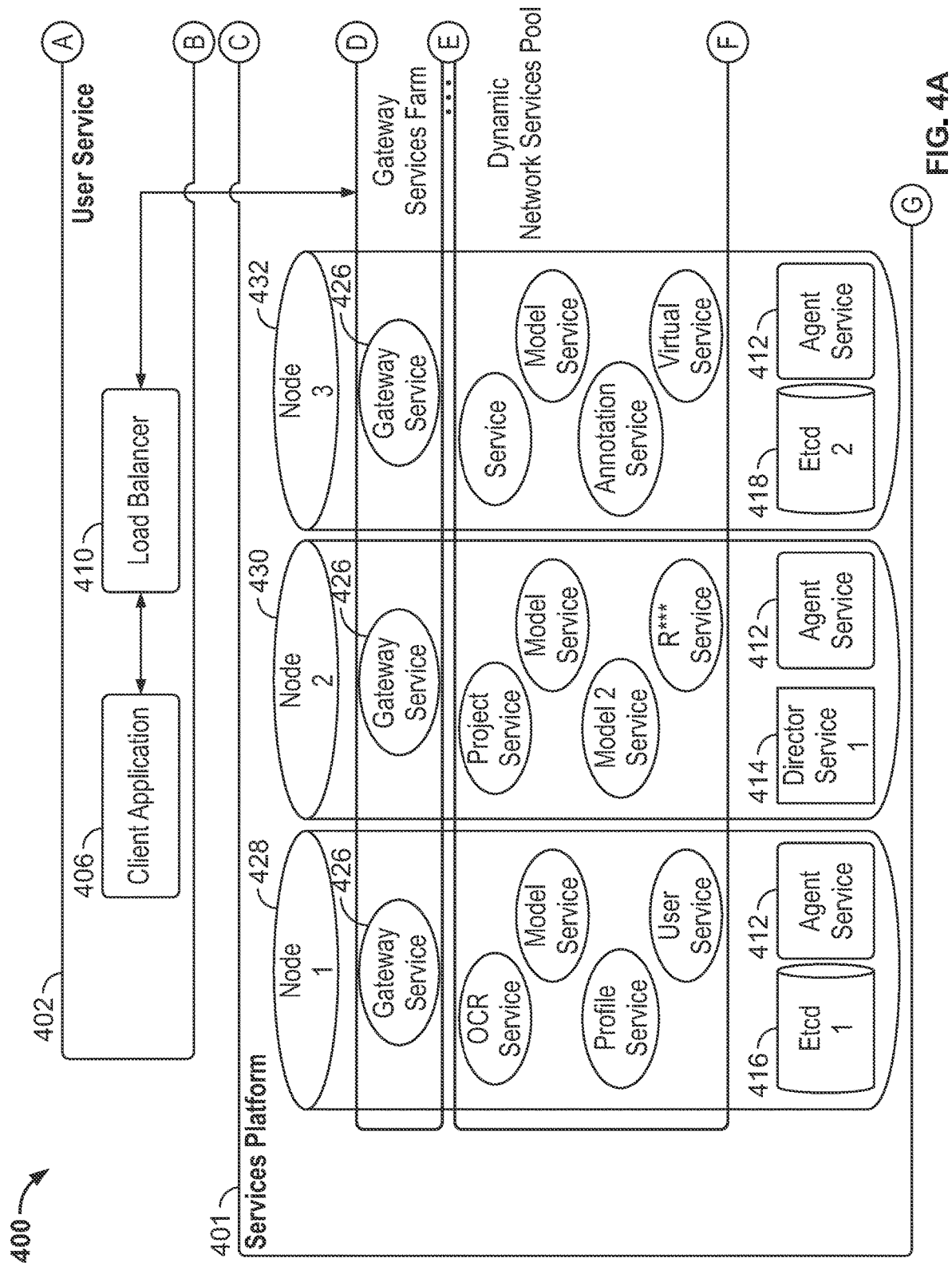
FIGS. 4A-4B show an illustrative apparatus in accordance with principles of the disclosure.
Figure 4B:
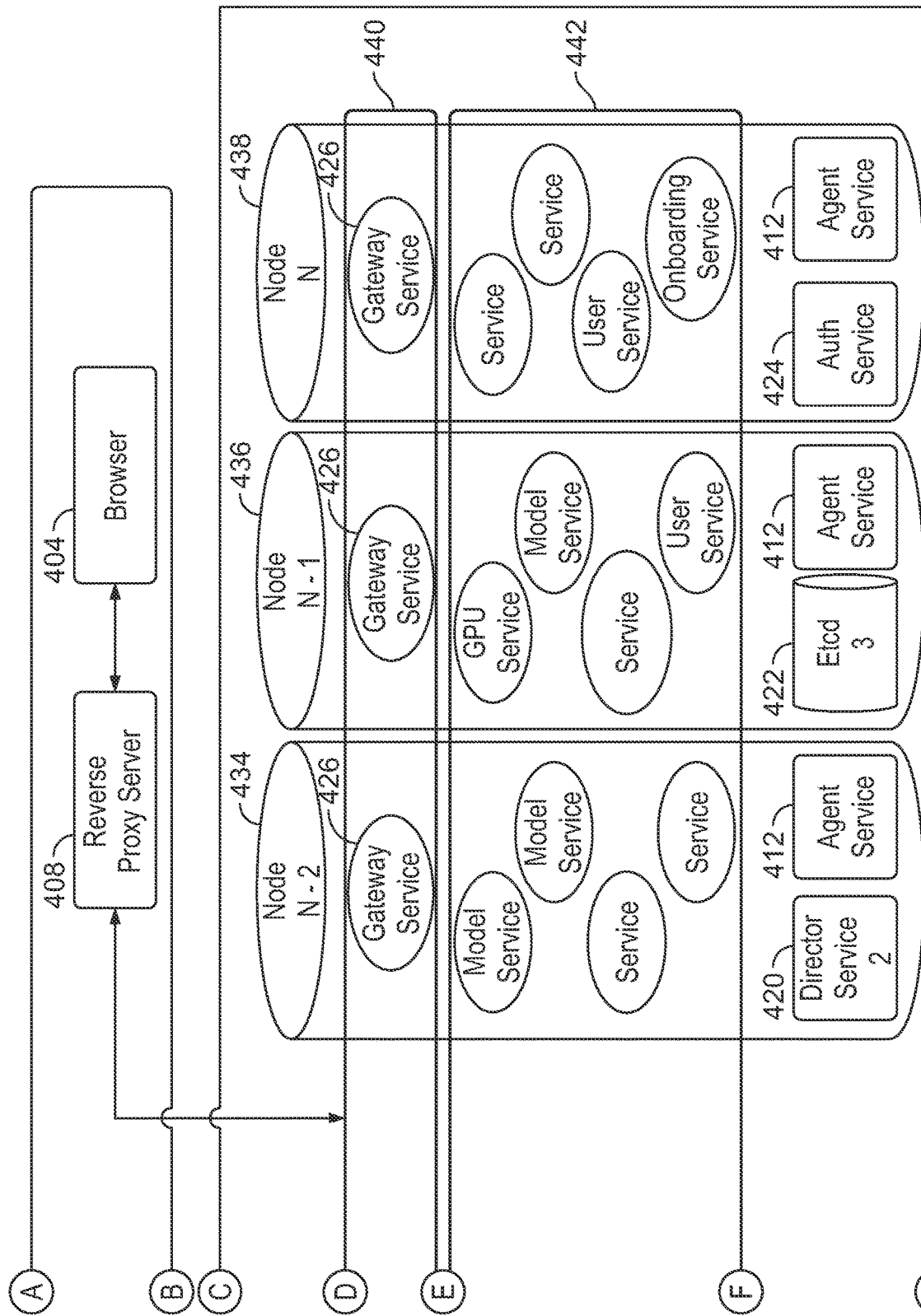

FIGS. 4A and 4B show an illustrative apparatus in accordance with principles of the disclosure. FIG. 4B is a continuation of FIG. 4A, and references to FIG. 4 may include both FIGS. 4A and 4B. A network cluster 400 may include one or more user service(s) 402, and a services platform 401.

In an embodiment, services platform 401 may include a gateway services farm 440 which may include one or more gateway service(s) 426. Services platform 401 may include nodes 1 through N, shown as node1 428, node2 430, node3 432, node N−2 434, node N−1 436, and node N 438. Nodes 4 through N−3 are not shown. Each node may include a gateway service 426, various network services in a dynamic network services pool 442, as well as various data stores, director services, authorization services, and agent services. In an embodiment, each node must include an agent service 412.

For example, node1 428 may include etcd data store1 416 as well as an agent service 412. Node2 430 may include a first director service 414 as well as agent service 412. Node3 432 may include etcd data store2 418 and an agent service 412. Node N−2 may include a second director service 420 and an agent service 412. Node N−1 may include etcd data store3 422 and an agent service 412. Node N may include an authorization service 424 and an agent service 412.

In an embodiment, computers/nodes may be added or removed from the services platform 401 as needed, without turning off the network cluster 400.

In an embodiment, each node may have multiple processor cores, and each node may handle one or more instances of a network service per core. Each instance of a network service may accept thousands of connections per second. Connections may be limited by hardware capabilities, connection latency, as well as software such as a load balancer 410 or reverse proxy server 408.

In an embodiment, each computer/node in the network cluster 400 may average thousands of available network services that it contributes to the services pool 442. Hardware, such as processor speed, number of cores, and RAM may limit the number. Software limits may also limit the number of network services. For example, an operating system may limit a computer to running 500 or less processes at one time, thereby limiting the number of network services that computer can host.

In an embodiment, user service 402 may include one or more of a client application 406, browser 404, load balancer 410, and reverse proxy server 408. In an embodiment, load balancer 410 and reverse proxy server 408 are not part of user service 402 and may exist elsewhere in cluster 400.

In an embodiment, browser 404 and/or client application 406 may be the entry points for a user (not shown) to access and use various network services in a dynamic network services pool 442. In an embodiment, client application 406 may send a request for a network service through a load balancer 410 to a gateway service 426 in a gateway services farm 440. If the request is approved/authorized, the gateway services farm 440 may grant access to the requested network service in the dynamic services pool 442 to the user service 402, through browser 404 or client application 406.

In an embodiment, network services pool 442 may be dynamic. Network services may be created, added, idle, and/or terminated from the pool 442 at various times.

Figure 5A:
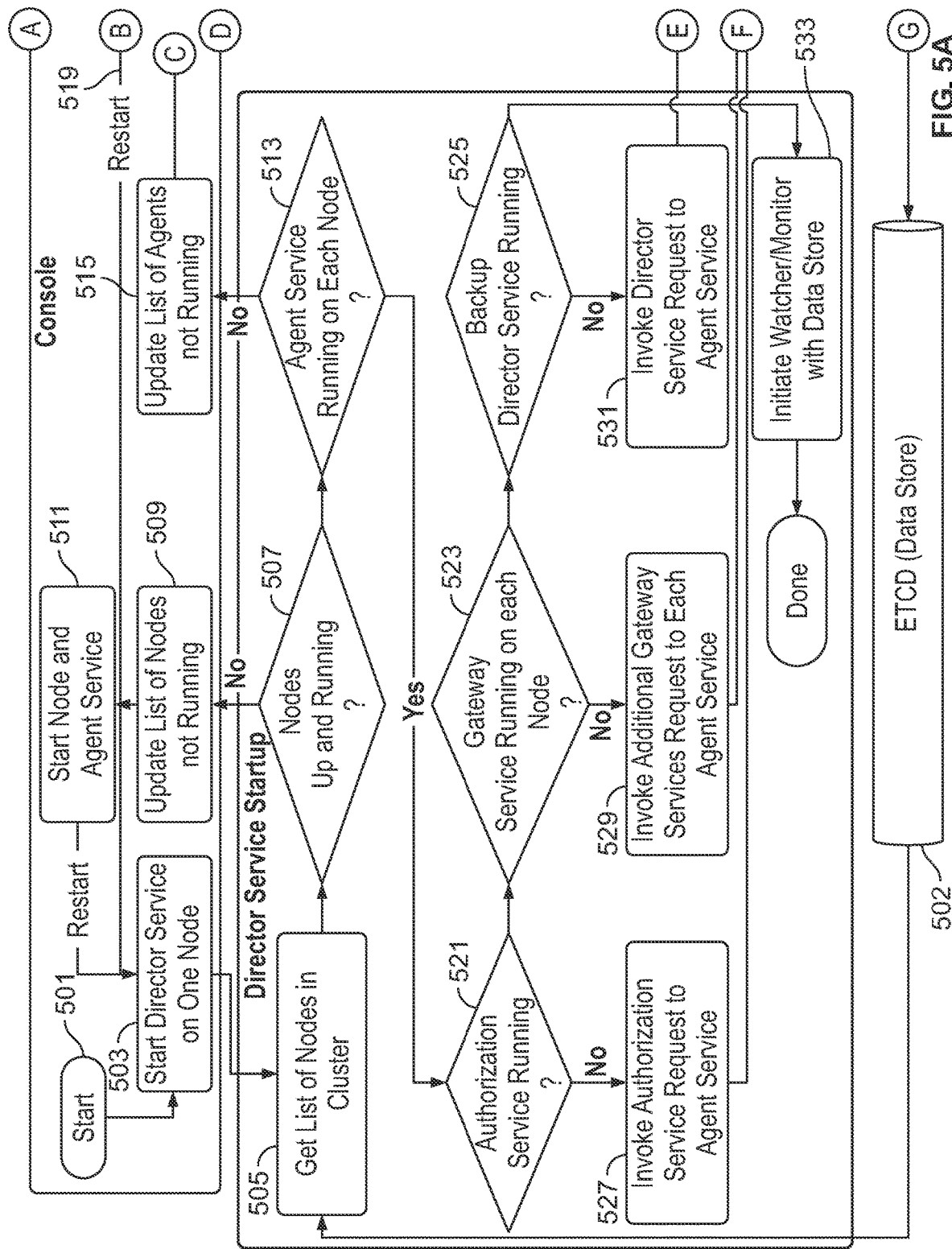
FIGS. 5A-5B show an illustrative process flowchart in accordance with principles of the disclosure.
Figure 5B:
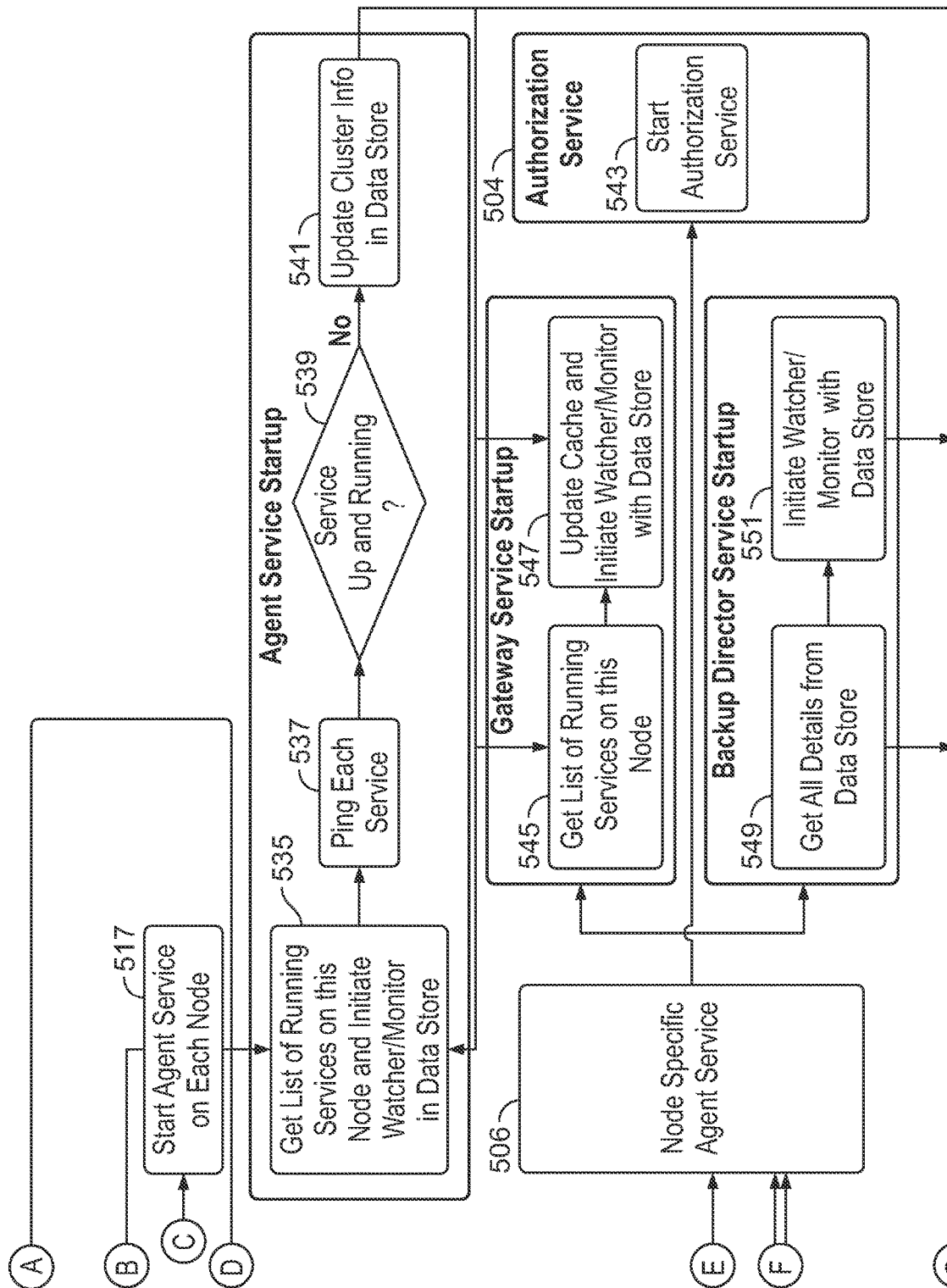

FIGS. 5A and 5B show an illustrative flowchart in accordance with principles of the disclosure. FIG. 5B is a continuation of FIG. 5A, and references to FIG. 5 may include both FIGS. 5A and 5B. Methods may include some or all of the method steps numbered 501 through 551. Methods may include the steps illustrated in FIG. 5 in an order different from the illustrated order. The illustrative method shown in FIG. 5 may include one or more steps performed in other figures or described herein. Steps 501 through 551 may be performed on the apparatus shown in FIGS. 1-4, or other apparatus, including console 500, etcd data store 502, authorization service 504, and node specific agent service 506 in FIG. 5.

In an embodiment, console 500 may be a node in a network cluster consisting of two or more nodes (not shown). FIG. 5 is an illustrative method of starting up the network cluster, with the necessary elements of the network.

In an embodiment, a user (such as a network administrator or a separate computer program) may start the startup method at step 501. At step 503 a director service is started on one node.

In an embodiment, a director service may be started with step 505, retrieving a list of all computers/nodes currently in the network cluster from data store 502. At step 507, the nodes are checked to see if they are connected and running. At step 509, if a node in the cluster is not connected and running, the list of nodes in data store 502 may be updated with this data. If a node is not running, an agent service on that node may be started at step 511. The method from step 503 may be repeated until all nodes are connected and running.

At step 513, every node in the cluster is checked to see if it has an agent service running on that node. If not, at step 515, the list of agent services not running may be updated in data store 502, and at step 517, an agent service may be started on any node that does not already have a running agent service. The method may then be repeated from step 503 until all nodes have a running agent service.

In an embodiment, steps 535 through 541 describe the startup method for an agent service. At step 535, the method may include retrieving a list of all running services from the data store 502 and initiating a watcher/monitor function in the data store 502. At step 537, the method may include querying each service. At step 539, if the necessary services are running, the agent service may be started. At step 541, if the services are not running, the method may include updating the data store 502.

At step 521, after the nodes have running agent services, the method may include determining if an authorization service 504 is running on the network cluster. At step 523, the method may include determining if a gateway service is running on each node. In an alternative embodiment, a gateway service does not need to be running on each node and may be limited to 3-5 gateway services spread among the nodes in the network cluster.

At step 525, the method may include determining if a backup director service is running in the network cluster. If there is a backup director service, a watcher (to monitor the network cluster) may be initiated at step 533, and the network cluster may be up and running at full capacity. In an embodiment, the network cluster may continue running until it crashes or is purposefully terminated.

At step 527, if an authorization service 504 is not running, the method may include sending a request to a specific node agent service 506 to start an authorization service at step 543.

At step 529, if a gateway service is not running on each node, or in an alternative embodiment, not enough gateway services are running, the method may include sending a request to a specific node agent service 506 to start a gateway service. A gateway service may be started with steps 545, acquiring a list of services running on a node, and 547, updating cache and initiating the gateway service (along with a monitor) with the data store 502.

Similarly at step 531, if a backup director service is not running, the method may include sending a request to a specific node agent service 506 to start a backup director service. The backup director service startup may include steps 549, retrieving all necessary data from data store 502, and 551, starting the backup director service and initiating the monitor portion of the service with the data store 502.

Figure 6:
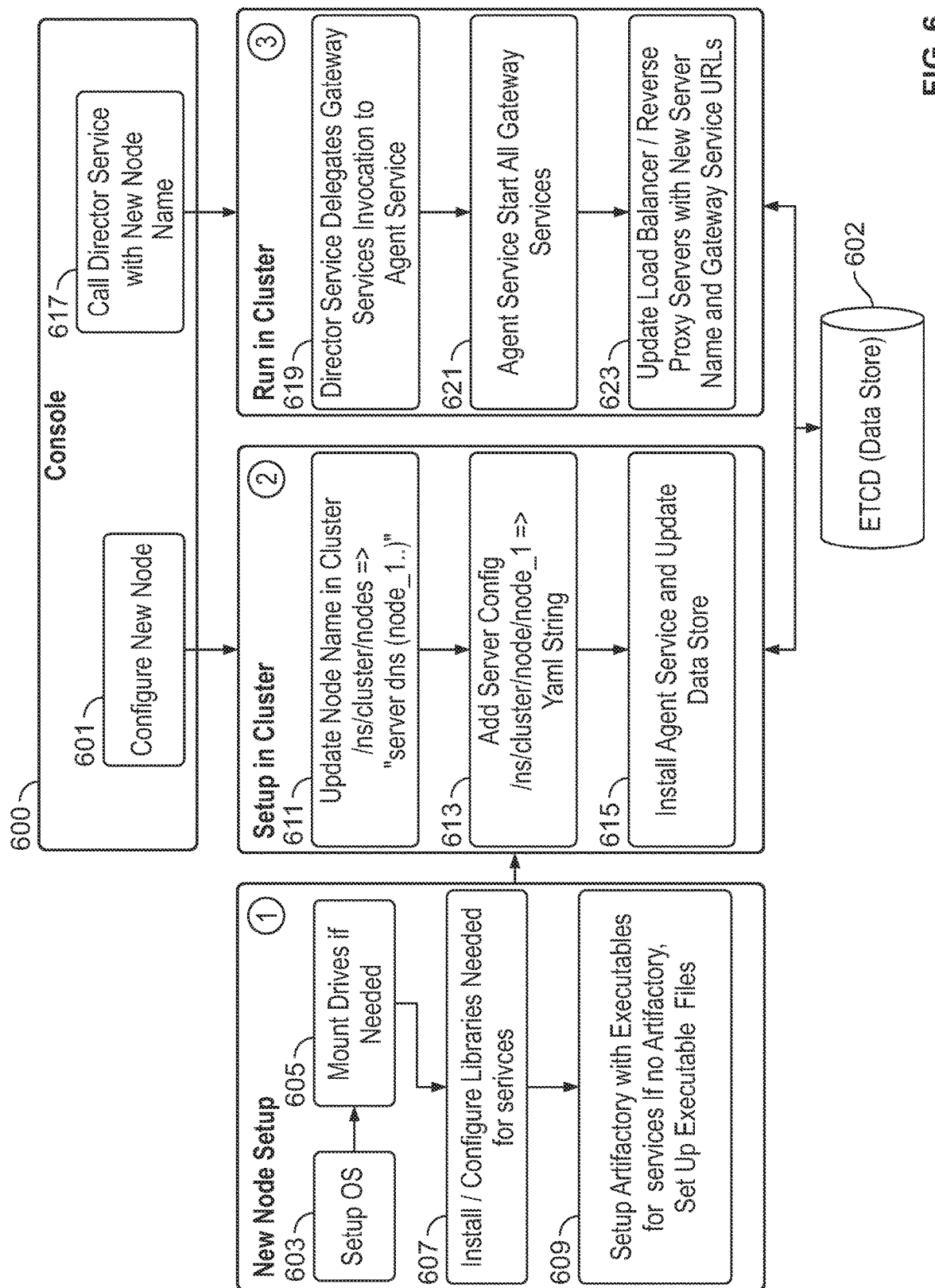
FIG. 6 shows an illustrative process flowchart in accordance with principles of the disclosure.

FIG. 6 shows an illustrative flowchart in accordance with principles of the disclosure. Methods may include some or all of the method steps odd-numbered 601 through 623. Methods may include the steps illustrated in FIG. 6 in an order different from the illustrated order. The illustrative method shown in FIG. 6 may include one or more steps performed in other figures or described herein. Steps 601 through 623 may be performed on the apparatus shown in FIGS. 1-4, or other apparatus, including console 600 and etcd data store 602 in FIG. 6.

FIG. 6 illustrates one embodiment of a method of adding a new computer/node to a network cluster, with the method broken into three parts. First, in steps 603 through 609, the new node/computer is physically readied to join the network cluster. At step 603, an operating system is setup on the node. At step 605, drives may be mounted on the node, if needed. At step 607, any libraries needed may be installed. At step 609, any executable files may be installed on the node.

At step 601, a user (e.g., a network administrator or an independent program) using console 600 may configure the new node. Console 600 may be installed on the new node or may be on a separate node.

In steps 611 through 615, the new node may be setup in the network cluster. At step 611, a name of the new node may be added to the network cluster's data store 602. At step 613, the new node may be configured for the network cluster. At step 615, an agent service may be installed on the new node and the data store 602 may be updated.

In steps 617 through 623, the new node may start to run in the network cluster. At step 617, a user (e.g., a network administrator or an independent program) using console 600 may call a director service in the network cluster with the new node, i.e., the director service may now see the new node. At step 619, the director service may delegate any gateway services necessary for the new node to the agent service on the new node. At step 621, the agent service on the new node may start any necessary gateway service for access to the network cluster. At step 623, the gateway service(s) and/or load balancer/reverse proxy server may be updated with the name of the new node and any addresses necessary to connect with the new node.

In an embodiment, as many new nodes may be removed or added to a network cluster. As the director service or a user (e.g., a network administrator or an independent program) using console 600 may add/remove a node by updating node names and addresses, the network cluster does not need to be shut down while the addition/removal is taking place.

In an embodiment, a new node/computer may be a virtual machine. If it is a virtual machine, no human involvement may be necessary, and the network cluster services (agent, user, director, gateway, etc.) may automatically add or remove virtual machines as necessary. Virtual machines may enable the addition of new network services (the number of which may have been limited by, e.g., an operating system limit on a number of processes) on the fly and automatically.

Thus, apparatus and methods for dynamic scaling and orchestration of network services have been provided. Persons skilled in the art will appreciate that the present invention can be practiced by other than the described embodiments, which are presented for purposes of illustration rather than of limitation.

What is claimed is:

1. A method for dynamically scaling and orchestrating network services automatically and without user intervention on a network comprising a cluster of two or more computers, without using any cloud or Internet connections, the network being contained within an internal intranet, the method comprising:

forming a network cluster comprising the two or more computers by:
starting a user service on each computer in the cluster;
starting an agent service on each computer in the cluster;
starting an authorization service on a computer in the cluster;
starting a gateway service on one or more computers in the cluster;
starting a director service on a computer in the cluster that is not running the authorization service;
receiving, at the gateway service, a request for a network service from a user of one of the computers in the cluster, wherein the request comprises one or more instructions;
redirecting the request to the authorization service to authenticate the user when an authorization header is absent from the request;
providing, from the authorization service, an authorization header with the request;
determining, by the gateway service, when an instance of the network service is available on one of the computers in the cluster, wherein the instance of the network service is available when the instance of the network service is idle and running on a computer in the cluster, and enabling the user to access the instance of the network service;
when an instance of the network service is unavailable on the computers in the cluster, requesting, by the gateway service, the director service create a new instance of the network service on an available computer in the cluster;
creating, by the director service, the new instance of the network service;
enabling the user to access the new instance of the network service;
connecting the user service to the instance of the network service or the new instance of the network service;
registering the gateway service as an observer of the new instance; and
purging the authorization header and the instructions from the gateway service;
wherein:
the one or more instructions comprise:
one or more command line commands to execute the network service;
one or more configurations required for the network service; and
one or more pre-requisite software programs that the network service requires; and
a computer in the cluster is available when the computer has enough free computing resources to run the new instance of the network service.

2. The method of claim 1, wherein when the instance of the network service is unavailable:
inquiring, by the director service, a data store for one or more details of the network service;
ensuring, by the director service, that enough instances of the network service are present in the cluster, wherein the number of instances required in the cluster is determined by the number of requests by user services for the network service;
initiating the new instance of the network service on a computer in the cluster;
updating the data store with one or more details of the new instance of the network service; and
providing the user service with the details of the new instance of the network service.

3. The method of claim 2, wherein the one or more details of the network service comprise:
a plurality of commands to initiate the network service;
a plurality of configurations required by the network service; and
prerequisite software needed by the network service.

4. The method of claim 2, wherein the one or more details of the new instance of the network service comprise:
the location of the new instance of the network service in the cluster; and
information permitting the user service to connect to the new instance of the network service.

5. The method of claim 1, wherein when the instance of the network service is unavailable:
determining, by the director service, when there are no available computers in the cluster; and
informing the user service that there are no available computers in the cluster.

6. The method of claim 1 further comprising:
terminating the network service when idle for a pre-determined period of time.

7. The method of claim 1 further comprising:
terminating an idle network service when a computer is unavailable to run the network service.

8. The method of claim 1 further comprising:
requesting, by the gateway service, the director service to initiate a new instance of the network service when an amount of requests for the network service within a pre-determined time period exceeds a pre-determined threshold or when a resource load of the network service exceeds a pre-determined threshold.

9. The method of claim 1 further comprising:
transferring, by the director service, the network service from a first computer in the cluster to a second computer in the cluster when a resource load of the first computer exceeds a pre-determined threshold.

10. The method of claim 1 further comprising:
syncing a first director service running on a first computer in the cluster with a second director service running on a second computer in the cluster.

11. The method of claim 4 wherein the director service analyzes the cluster through an artificial intelligence algorithm.

* * * * *